(12) United States Patent
Eltner et al.

(10) Patent No.: US 6,387,269 B1
(45) Date of Patent: May 14, 2002

(54) MEMBRANE FOR SEPARATING FLUIDS

(75) Inventors: Ansgar Eltner, Köln; Hans-Georg Göbbel, Mannheim; Andreas Nickel, Wetter; Lothar Puppe, Burscheid, all of (DE); Masakazu Kondo, Chiba (JP); Yoshio Morigami, Okayama (JP); Kenichi Okamoto, Yamaguchi (JP); Hidetoshi Kita, Yamaguchi (JP)

(73) Assignees: Bayer Aktiengesellschaft, Leverkusen (DE); Mitsui Zosen Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/360,264

(22) Filed: Jul. 26, 1999

(30) Foreign Application Priority Data

Jul. 27, 1998 (JP) .............................. 10-210730

(51) Int. Cl.$^7$ .......................... B01D 61/36; B01D 71/06
(52) U.S. Cl. .................. 210/640; 210/490; 210/500.25; 210/502.1; 55/523; 55/524; 95/45; 502/4; 502/60
(58) Field of Search .................. 210/490, 500.25, 210/502.1, 640; 585/818; 502/4, 60; 95/45; 55/523, 524; 427/244; 264/45.5

(56) References Cited

U.S. PATENT DOCUMENTS

| | | | |
|---|---|---|---|
| 2,950,952 A | * | 8/1960 | Breck et al. |
| 2,953,502 A | | 9/1960 | Binning et al. |
| 4,061,724 A | * | 12/1977 | Grose et al. |
| 4,699,892 A | | 10/1987 | Suzuki |
| 4,861,739 A | * | 8/1989 | Pellet |
| 5,019,263 A | | 5/1991 | Haag et al. |
| 5,258,339 A | | 11/1993 | Ma et al. |
| 5,362,522 A | * | 11/1994 | Barri et al. |
| 5,716,527 A | * | 2/1998 | Deckman et al. |
| 5,779,904 A | * | 7/1998 | Ruderman et al. |

FOREIGN PATENT DOCUMENTS

| | | |
|---|---|---|
| EP | 0 659 469 A2 | 6/1995 |
| FR | 2719238 | 11/1995 |
| WO | 95/29751 | 11/1995 |

OTHER PUBLICATIONS

Patent Abstracts of Japan, vol. 1997, No. 02, Feb. 28, 1997 & JP 08 257301 A (Mitsui Eng & Amp; Shipbuild Co Ltd), Oct. 8, 1996 *Zusammenfassung* –& Database WP I Section Ch, Derwent Publications Ltd., London, GB; Class E33, AN 1996–500809 XP002121061 *Zusammenfassung* –& Chemical Abstracts, vol. 126, No. 3, Jan. 20, 1997 Columbus, Ohio, US; abstract No. 33856, XP002121059.

Patent Abstracts of Japan, vol. 1997, No. 2, Feb. 28, 1997 & JP 08 257302 A (Mitsui Eng & Amp; Shipbuild Co Ltd), Oct. 8, 1996 *Zusammenfassung* –& Database WP I Section Ch, Derwent Publications Ltd., London, GB; Class D15, AN 1996–500810 XP002121062 *Zusammenfassung* –& Chemical Abstracts, vol. 126, No. 3, Jan. 20, 1997 Columbus, Ohio, US; abstract No. 33857, XP002121060.

* cited by examiner

Primary Examiner—Ana Fortuna
(74) Attorney, Agent, or Firm—Norris McLaughlin & Marcus

(57) ABSTRACT

A porous composite structure, and in particular a membrane, for separating fluids is described. The composite structure comprises at least a porous support and a zeolite layer applied to the support and the zeolite is a zeolite of the T type or of an erionite type.

14 Claims, 5 Drawing Sheets

MEMBRANE FOR SEPARATING FLUIDS

The present invention relates to a porous composite structure, in particular a membrane for separating fluids, which comprises at least a porous support and a zeolite layer applied to the support and in which the zeolite is a zeolite of the T type or of an erionite type.

In recent years the separation of organic and aqueous phases has formed an important area in the development and use of membranes and membrane processes. One important field of application is for example the separation of azeotropic mixtures or mixtures having a narrow boiling point range by means of pervaporation or vapour permeation. In this process the mixture to be separated (the feed) is applied to the membrane in the form of a liquid (pervaporation) or a vapour (vapour permeation). The mixture is separated into two streams via the membrane: into a permeate which is separated off via the membrane and has a considerably higher concentration of water than the feed stream, and a retentate, the water content of which is lower than that of the starting mixture.

The currently most widely developed membranes for the above applications are organic dense polymer membranes, such as for example polyvinyl alcohol membranes, as described in U.S. Pat. No. 2,953,502, which are used for the separation of azeotropic alcohol/water mixtures. The selectivity of these organic membranes is limited. It is for example highly complicated to separate a methanol/water mixture by means of organic membranes and no advantages over distillation are therefore provided. In addition, organic membranes do not have sufficient thermal and chemical stability. The characteristic temperature resistance of up to a maximum of 100° C. and the limited solvent resistance (such as for example to DMF or acetonitrile) considerably restrict the fields of application of organic membranes.

More recent developments have been focussed on inorganic membranes which provide comparable or higher selectivity than dense organic membranes. U.S. Pat. Nos. 5,258,339 and 4,699,892 describe the production of a composite membrane comprising a separating zeolite layer not described in more detail and a porous inorganic supporting layer. Offenlegungsschrift EP 0,659,469 provides a more detailed description of the structure of a membrane comprising a separating zeolite layer of the NaA type and a porous support for separating liquid mixtures, such as for example alcohol/water mixtures.

The use of these membranes for separating acidic organic/aqueous mixtures of the kind frequently encountered in industry, in particular in reaction processes, is not possible due to the pH instability of the NaA zeolite layer applied. When in contact with aqueous solutions of a low pH value the zeolite layers decompose within a very short time, i.e. the active layer of the membrane is destroyed, so that the selective separation of water from acidic organic/aqueous mixtures is not possible using such membranes. The same applies to a zeolite layer of the NaY type, as described in JP 08257301.

In laid-open specification JP 08257302, a resistant inorganic zeolite membrane is described in which the separating layer comprises a ZSM5-type zeolite. Although this zeolite is resistant to acids, it is hydrophobic and thus predominantly separates hydrophobic substances. It is not particularly permeable to water. A membrane having a layer of a ZSM-5 zeolite is therefore not suitable for removing water from aqueous/organic systems.

FR 2 719 238 describes a different structure for a composite membrane comprising zeolites and an inorganic support. The zeolite only fills the large pores of the support material and separation therefore takes place via the zeolite crystals located within the large pores of the support material. The production of such a structure in a defect-free, i.e. dense form, is difficult and is only possible if the zeolite penetrates deeply into the pores of the support material. The resulting large zeolite thicknesses greatly impede mass transfer and the permeation flow rates are therefore low. The use of such membranes is thus comparatively ineffective.

The problem on which the invention is based is that of providing a membrane which does not have the disadvantages of known membranes, is suitable for separating organic/aqueous mixtures, in particular acidic phases, provides high selectivity and sufficient permeation flux and has a long service life given sufficient temperature stability.

The above problem is solved according to the invention by a porous composite structure, in particular a membrane, which comprises a porous support structure to which a film consisting of a zeolite of the T type or of an erionite type is attached, has high selectivity and a high permeation flow rate as well as high acid stability and which is suitable for separating acidic, organic/aqueous mixtures of the kind frequently encountered in industry, in particular in conjunction with chemical reactions, by means of pervaporation, vapour permeation and gas permeation.

The present invention relates to a porous composite structure, in particular a membrane for separating fluids, which comprises at least a porous support and a zeolite layer applied to the support and in which the zeolite is a zeolite of the T type or of an erionite type.

The composite structure according to the invention comprises a porous support material and a zeolite applied thereto which forms a defect-free, dense layer. The zeolite applied is a zeolite of the T type or of the erionite type. This zeolite has high stability towards acids and organic solvents. At the same time, by virtue of its hydrophilic properties and its small pores in the form of eight-membered rings (the pore diameter typically being 3.6×5.1 Å) it allows the selective removal of water from mixtures. This composite structure avoids the abovementioned disadvantages of known membranes and is excellently suitable in particular for the separation of water from acidic organic/aqueous mixtures.

It has been found that in particular a zeolite of the T type or erionite type displays the above properties and is therefore especially suitable for the production of the separating layer. The composite structure can be produced in a hydrothermal process in which the zeolite layer is crystallized directly onto the support at low temperatures.

The term "erionite" refers to the naturally occurring variant of the abovementioned zeolite. A comparable synthetically produced zeolite is referred to as T-type zeolite, which is always a mixture comprising erionite zeolite (in a molar proportion of 0.5–0.95) and offretite zeolite (in a molar proportion of 0.5–0.05).

The suitable porous support can consist of a ceramic material or a metal oxide, such as for example aluminium oxide, silicon dioxide, zirconium oxide, silicon nitride, silicon carbide etc. or of a metal, such as for example aluminium, silver or special steel or of organic polymers, polypropylene, polyethylene, polytetrafluoroethylene, polysulphone and polyimide.

The support preferably has an average pore diameter of 0.05 $\mu$m–10 $\mu$m, in particular 0.1 $\mu$m–2 $\mu$m, and a porosity of 10% to 60%, preferably 30% to 50%. The porosity or degree of porosity is understood to be the ratio of the pore volume to the total volume of the support structure. Smaller pore diameters than 0.05 $\mu$m are not suitable due to the insufficient permeation flow rates. A porosity of less than 10% also produces a large reduction in the permeation flow rate. If the pore diameter is larger than 10 μm a decrease in selectivity may occur. A porosity of higher than 60% also results in a decrease in selectivity and in the strength of the material.

A particularly preferred support for the composite structure comprises aluminium oxide with an average diameter of 0.1 μm–0.2 μm and a porosity of 30%–50%, and contains 50% to 100% $Al_2O_3$.

The porous support is not subject to any limitations from the point of view of its external geometry. An advantageous geometry for pervaporation and vapour permeation consists of tubes of a length of 10–100 cm and having an external diameter of at least 10 mm and a tube thickness of at least 0.2 mm to several millimetres. The zeolite layer can be applied to the internal and/or external surface of the tubular support structure, and preferably to the external surface. The porous structure can also be a cylindrical structure having an external diameter of 30–100 mm and a length of 20–100 cm and a large number of longitudinal channels with diameters of 2–12 mm.

A T-type zeolite or an erionite zeolite is synthesized on this support material in a hydrothermal process in which silicon dioxide powder or sodium silicate are used as the silicon sources, sodium aluminate and aluminium hydroxide as the aluminium sources and sodium and potassium hydroxide as the cation sources. A specific mixture comprising the abovementioned starting substances is suspended in distilled water, stirred and allowed to age for a specific time (1–48 hours). Then the support is immersed in this solution and the zeolite layer is applied by hydrothermal synthesis under specific conditions. The porous support preferably contains seed crystals of an average size of less than 50 μm, and preferably zeolite crystals of an average size in the range from 10–150 μm. The quantity of seed crystals on the porous support is 1–500 mg/cm$^2$, preferably 10–60 mg/cm$^2$.

In addition to hydrothermal processes, other processes, such as for example gas phase deposition, can be used for the coating of the porous support. The hydrothermal process for the production of the zeolite layer is carried out at a temperature in the range from 60 to 1 50° C., preferably 80–110° C., and for a period of 1 to 48 hours, preferably 20–24 hours, followed by washing for a period of 6–24 hours and then drying again.

A particularly preferred composite structure is characterized in that the zeolite film of the T type or erionite type forms a defect- and crack-free layer on the support material.

The zeolite film of the T type or erionite type is formed on the composite structure particularly by hydrothermal deposition using starting materials in the following molar ratios:

| | |
|---|---|
| $SiO_2/Al_2O_3$ | from 30 to 150, |
| $OH^-/SiO_2$ | from 0.1 to 1, |
| $Na^+/(Na^+ + K^+)$ | from 0.1 to 1, and |
| $H_2O/(Na^+ + K^+)$ | from 10 to 50. |

The zeolite film of the T type or erionite type preferably has a layer thickness of from 3 to 100 μm, and more preferably from 10 to 50 μm.

If the zeolite film of the T type or erionite type is formed on both sides of an in particular tubular, porous support, the thickness of the zeolite film is in particular 10–50 μm and the total thickness of the composite structure is from 1 to 3 mm, including the support material.

The invention also relates to the use of a composite structure according to the invention for separating fluids, in particular fluids comprising organic compounds and water or organic mixtures optionally containing water, by means of pervaporation, vapour permeation or gas permeation.

The composite structure according to the invention is particularly preferably used for separating water from acidic (pH value>7, preferably>4) organic/aqueous mixtures by means of pervaporation, vapour permeation or gas permeation.

The membrane according to the invention can be used for the selective separation of water from liquid or vaporous mixtures comprising alcohols (such as for example methanol, ethanol, propanol, etc.), ketones (such as for example acetone and methyl ethyl ketone, etc), halogenated hydrocarbons (such as for example carbon tetrachloride and trichloroethylene, etc.), gases, such as for example $CO_2$ and $N_2$, or generally aqueous, acidic mixtures which may contain for example hydrochloric acid, acetic acid or phenol or which comprise two or more of the above components, by means of pervaporation and vapour permeation.

The membrane according to the invention having a coating of a zeolite of the T type or erionite type differs from other currently available hydrophilic membranes in its capacity to selectively separate water from organic/aqueous mixtures, in particular from mixtures containing acidic components, of the kind frequently encountered in industry, at high permeation flow rates, and in its long-term stability in acidic media.

Such membranes can therefore be used in membrane reactors in the presence of acidic components for the systematic removal of a particular reaction product. They represent energy- and space-saving coupling devices in reaction and membrane technology.

The invention is illustrated in more detail below, with the aid of FIGS. 1 to 5, without being specifically limited thereby.

EXAMPLES

Example 1 (production, effects of the conditions)

Various membranes were produced for analysis and characterization. For this purpose several parameters were varied in order to illustrate the effects of the composition of the starting solution, the synthesis time and the synthesis temperature.

A silicon source comprising colloidal silicon oxide, an aluminium source consisting of sodium aluminate, a cation source consisting of sodium and potassium hydroxide and distilled water were mixed in the following molar ratios:

| | |
|---|---|
| SiO$_2$/Al$_2$O$_3$ | from 30 to 150, |
| OH$^-$/SiO$_2$ | 0.77, |
| Na$^+$/(Na$^+$ + K$^+$) | 0.77, and |
| H$_2$O/(Na$^+$ + K$^+$) | 20.75. |

Figure 1:
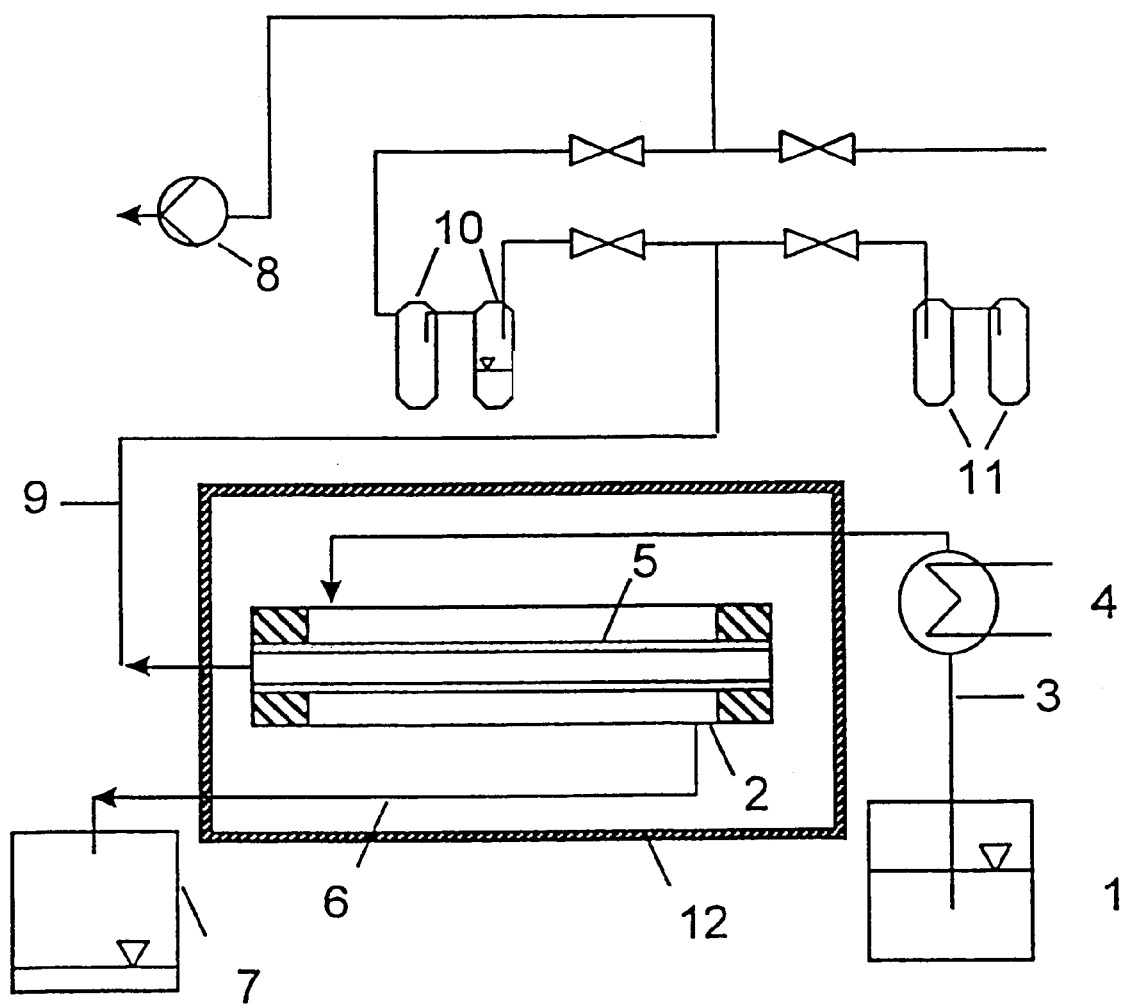
FIG. 1 depicts the schematic layout of a unit for separating ethanol and water using a tubular composite structure according to the invention.

The solution was first of all stirred and aged in air at room temperature for 28–48 hours. Then a porous, tubular support, whose surface was inoculated with seed crystals of the T type, was immersed in the above solution. The support consisted of "Mullite", produced by NIKKATO Co., Ltd, Japan, had a length of 14 cm, an external diameter of 1.2 cm, a thickness of 1.5 mm, a pore diameter of 1 µm and a porosity of 40%. The hydrothermal synthesis was carried out for 5–156 hours under atmospheric pressure at a temperature of between 80 and 150° C., followed by rinsing with distilled water for 6–24 hours and subsequent drying. The zeolites formed were examined by means of X-ray structural analysis. The data obtained corresponded closely to those obtained using T-type zeolites containing 70% of erionite and 30% of offretite. This therefore demonstrates that the synthesized zeolite layer is T-type zeolite. The thickness of the zeolite layer was between 30 and 100 µm in these analyses. In addition tests were carried out with the resulting membranes for determining their separation characteristics in a unit of the kind depicted in FIG. 1.

The feed solution 1 is introduced into the cell 2 via line 3 and the heat exchanger 4. In the cell 2 containing the abovementioned membrane 5 the separation of the organic/aqueous mixture takes place. After the separation, the retentate leaves the cell via line 6 and is collected in the retentate collecting vessel 7. A vacuum (0.1 mm Hg) is produced on the permeate side of the membrane by means of vacuum pump 8. The permeating vapour is discharged via line 9 alternately into cooling trap 10 or cooling trap 11, where it is condensed with liquid nitrogen or dry ice/alcohol mixtures. For the systematic adjustment of the temperature, the cell 2 is enclosed within a thermostat 12. The composition of the solutions is determined by means of gas chromatography or by means of IR photometry. The efficiency of the membrane can be defined by the membrane flow rate per unit area [kg/m$^2$h] and by the selectivity factor α, which is defined as follows:

$$\alpha = \frac{\dfrac{X_P^{H_2O}}{X_P^{Org}}}{\dfrac{X_F^{H_2O}}{X_F^{Org}}}.$$

In this equation $X_F^{H_2O}$ and $X_F^{Org}$ are the mass fractions in the feed solution and $X_P^{H_2O}$ and $X_P^{Org}$ are the mass fractions in the permeate solution.

The conditions of the membrane production and the results of the tests are described below.

Figure 2:
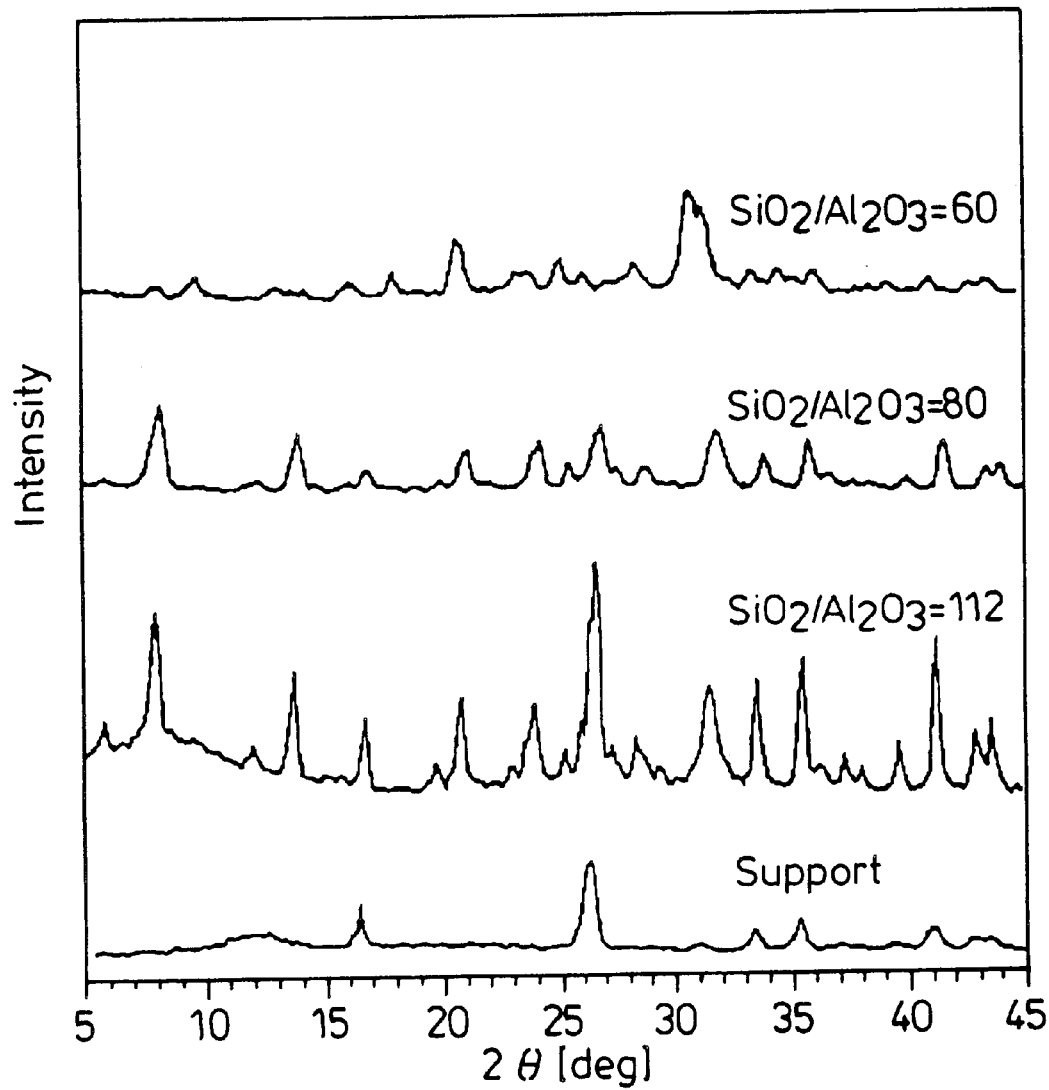
FIG. 2 depicts diffraction intensity curves of three T-type membranes with different coatings and a non-coated support.

FIG. 2 shows the results of the X-ray structural analysis of T-type zeolite membranes. The synthesis solution was in each case aged 48 hours before the synthesis. The hydrothermal synthesis was carried out at 100° C. over a synthesis time of 24 hours while varying the solution composition within limits of SiO$_2$/Al$_2$O$_3$=60–112.

Figure 3:
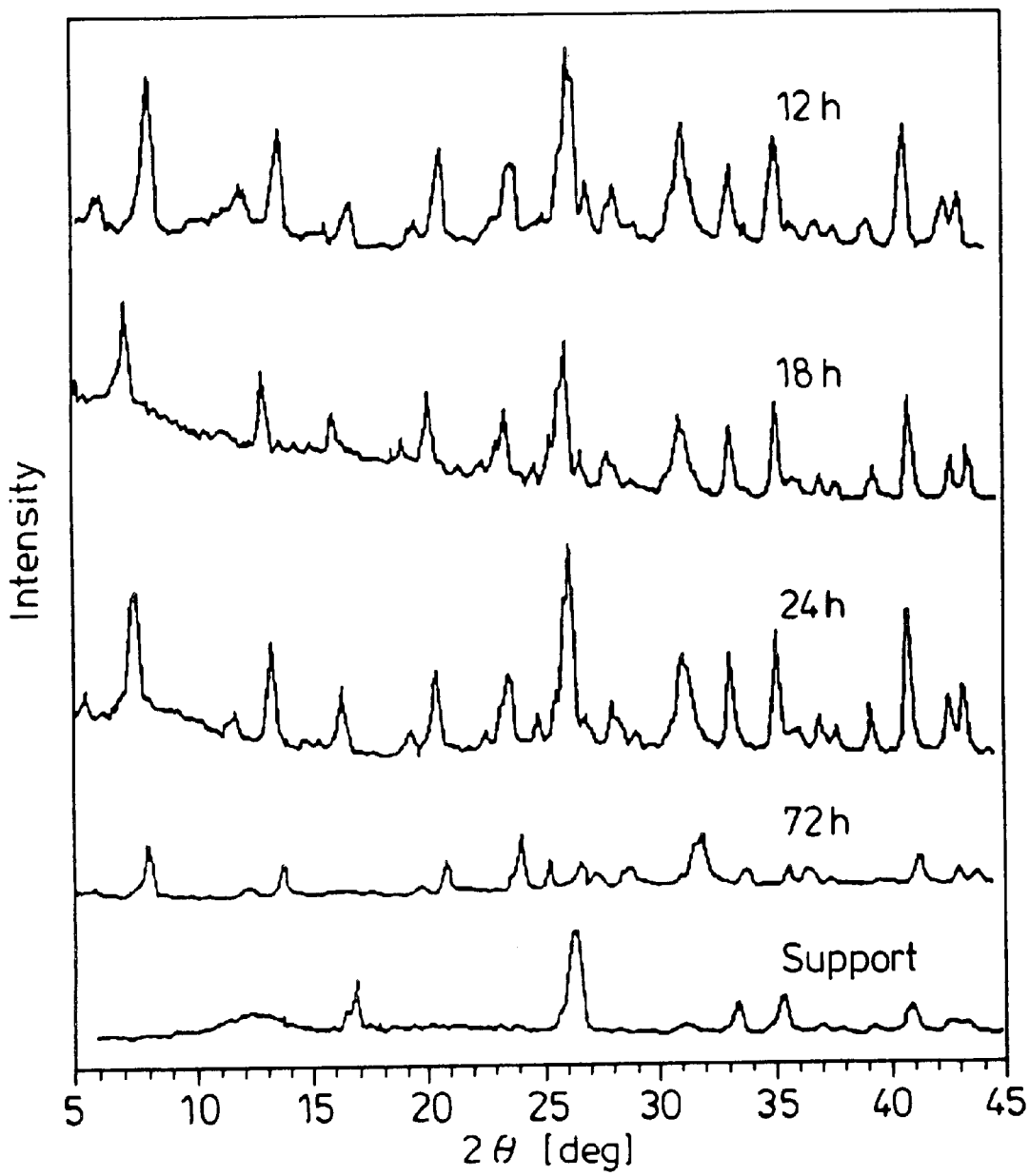
FIG. 3 depicts diffraction intensity curves of four T-type zeolite membranes with different synthesis times and a non-coated support.

FIG. 3 shows the X-ray structural analysis of a T-type membrane produced using differing synthesis times. As mentioned above, the ageing time of the solution was 48 hours. The SiO$_2$/Al$_2$O$_3$ molar ratio was 112 and the temperature 100° C.

Table 1 shows the separating capacities of the T-type zeolite membranes, the results of the X-ray structural analysis of which are shown in FIG. 3. The pervaporation tests were carried out at a feed/mass ratio EtOH/water of 90/10 and a feed temperature of 75° C. Q is the total flow rate over the membrane, $Q_{H_2O}$ the water flow rate and α the selectivity of the membrane.

Figure 4:
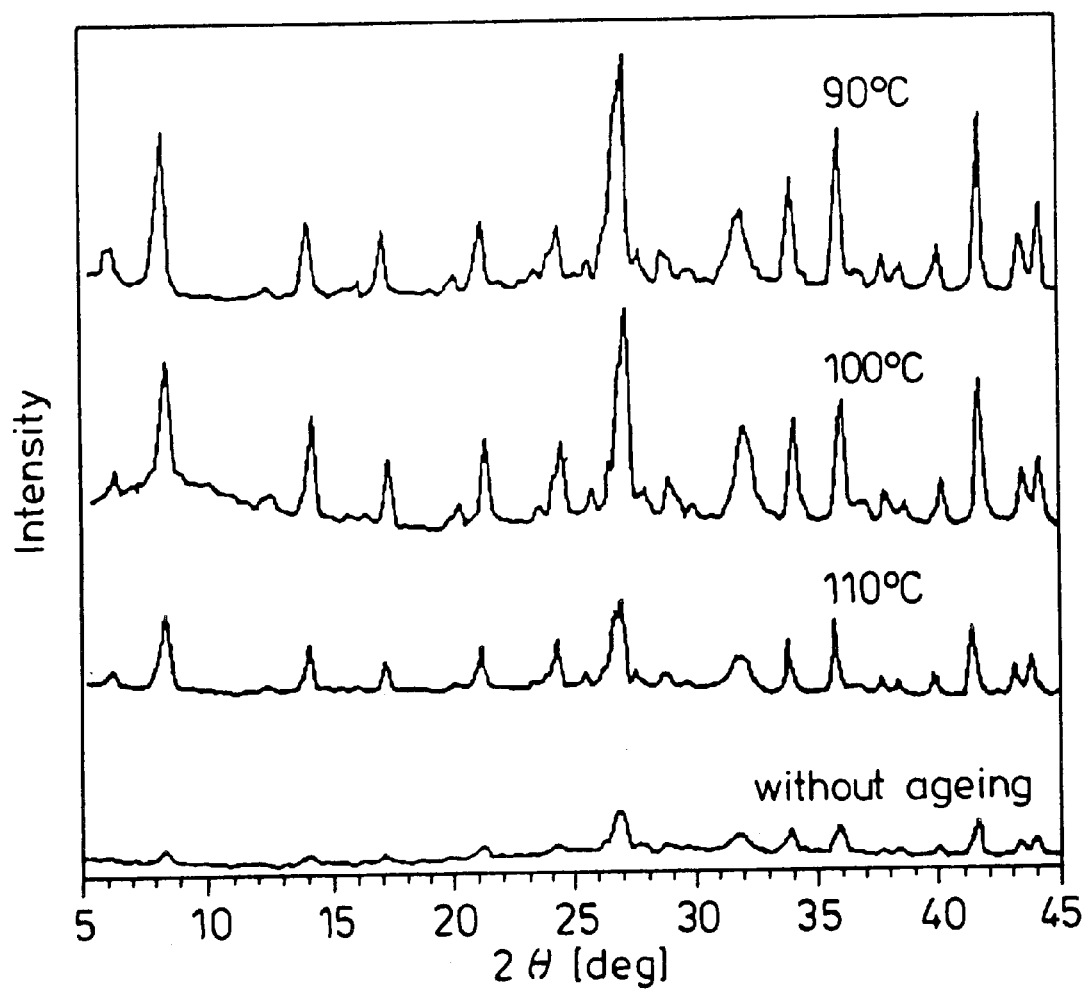
FIG. 4 depicts diffraction intensity curves of T-type membranes of the same synthesis composition but a different synthesis temperature as well as a membrane produced from a non-aged solution.

FIG. 4 shows the X-ray structural analyses of T-type zeolite membranes which were produced at different temperatures and at a constant SiO$_2$/Al$_2$O$_3$ molar ratio of 112 and a constant synthesis time of 24 hours (Examples 2.1 to 2.3). The ageing time of the solution was, as mentioned above, 48 hours. Example 2.4 shows the properties of a non-coated support. Compared with the synthesis using an aged solution, FIG. 4 shows the results of the X-ray structural analysis of a membrane (without ageing) which was produced at a synthesis temperature of 100° C. without any previous ageing of the solution.

The separating capacities of these membranes are shown in Table 2. The corresponding tests were again carried out at a feed/mass ratio of EtOH/water of 90/10 and a feed temperature of 75° C. This demonstrates that effective separating results are obtained with the membranes described according to the present invention.

TABLE 1

| synthesis time [h] | results of the coating | H$_2$O content in the permeate [wt. % H$_2$O] | total flow rate Q [kg/m$^2$h] | H$_2$O partial flow rate $Q_{H_2O}$ [kg/m$^2$h] | EtOH partial flow rate $Q_{EtOH}$ [kg/m$^2$h] | selectivity α [−] |
|---|---|---|---|---|---|---|
| 12 | uniform | 63.24 | 0.60 | 0.36 | 0.22 | 14 |
| 18 | uniform | 98.30 | 0.77 | 0.76 | 0.013 | 490 |

TABLE 1-continued

| synthesis time [h] | results of the coating | $H_2O$ content in the permeate [wt. % $H_2O$] | total flow rate Q [kg/m²h] | $H_2O$ partial flow rate $Q_{H2O}$ [kg/m²h] | EtOH partial flow rate $Q_{EtOH}$ [kg/m²h] | selectivity α [-] |
|---|---|---|---|---|---|---|
| 24 | uniform | 99.80 | 1.25 | 1.25 | 0.0005 | 2200 |
| 72 | not uniform | 50.78 | 0.53 | 0.27 | 0.26 | 10 |

TABLE 2

Effects of the synthesis temperature on the efficiency of the membrane

| example no. | synthesis temperature [° C.] | results of the coating | $H_2O$ content in the permeate [wt. % $H_2O$] | total flow rate Q [kg/m²h] | $H_2O$ partial flow rate $Q_{H2O}$ [kg/m²h] | EtOH partial flow rate $Q_{EtOH}$ [kg/m²h] | selectivity α [-] |
|---|---|---|---|---|---|---|---|
| 1.1 | 90 | uniform | 97.90 | 0.93 | 0.91 | 0.02 | 440 |
| 1.2 | 100 | uniform | 99.60 | 1.25 | 1.245 | 0.005 | 2200 |
| 1.3 | 110 | uniform | 96.04 | 0.33 | 0.32 | 0.01 | 210 |
| 1.4 | — | no coating | — | >10 | — | — | 1 |

TABLE 3

Comparison of the properties of the membranes produced according to Example 2 with conventional zeolite membranes (acid resistance)

| example no. | membrane type | treatment | temperature [° C.] | duration [h] | total flow rate Q [kg/m²h] | selectivity α [-] | remarks |
|---|---|---|---|---|---|---|---|
| 2.1 | NaA type | none | — | — | 1.62 | 10000 | — |
| 2.2 | NaA type | HOAc | RT | 100 | — | 1 | zeolite layer no longer present |
| 2.3 | NaA type | none | — | — | 1.80 | 10000 | — |
| 2.4 | NaA type | HOAc | RT | 100 | — | 1 | zeolite layer no longer present |
| 2.5 | erionite type | none | — | — | 1.0 | 800 | — |
| 2.6 | erionite type | pH 4 | RT | 100 | 1.4 | 2000 | — |
| 2.7 | erionite type | none | — | — | 1.0 | 800 | — |
| 2.8 | erionite type | pH 3 | RT | 100 | 1.4 | 3000 | — |
| 2.9 | erionite type | none | — | — | 1.2 | 2000 | — |
| 2.10 | erionite type | pH2 | RT | 100 | 0.8 | 700 | — |

Example 2 (production and use)

Amorphous silica is introduced with stirring into an aqueous solution comprising sodium aluminate, sodium hydroxide and potassium hydroxide and allowed to age for 48 hours. The composition of the solution corresponds to the following molar ratios:

| | |
|---|---|
| $SiO_2/Al_2O_3$ | 112, |
| $OH^-/SiO_2$ | 0.77, |
| $Na^+/(Na^+ + K^+)$ | 0.77, and |
| $H_2O/(Na^+ + K^+)$ | 20.75. |

Then a porous tubular support whose surface is provided with seed crystals is immersed in the above reaction mixture. The support is of the same kind as that described in Example 1. The hydrothermal synthesis is carried out 40 for 24 hours at 100° C., followed by rinsing for 12 hours and drying at 70° C.

The acid resistance of the zeolite layer of membranes produced as described above was tested by acid treatment with solutions of differing pH values. The membranes were immersed in various acetic acid solutions of pH 2, pH 3 and pH 4 for 24 hours at room temperature.

Table 3 shows the results of a comparison between the efficiency of acid-treated and non-treated membranes and that of conventional NaA zeolite membranes. It is quite clear that the zeolite membrane of the NaA type is not suitable for separating ethanol/water mixtures in an acid environment. Prior to the treatment in acetic acid solution (pH=4) the membrane has high selectivity, and after said treatment no further separation can be detected. By contrast the T-type zeolite membranes produced as described above do not display any losses in efficiency after acid treatment.

The above ethanol/water separation processes using acid-treated membranes are representative of various processes for separating acidic, organic/aqueous mixtures of the kind frequently encountered in industry, in particular in conjunction with chemical reactions.

Example 3 (use)

Figure 5:
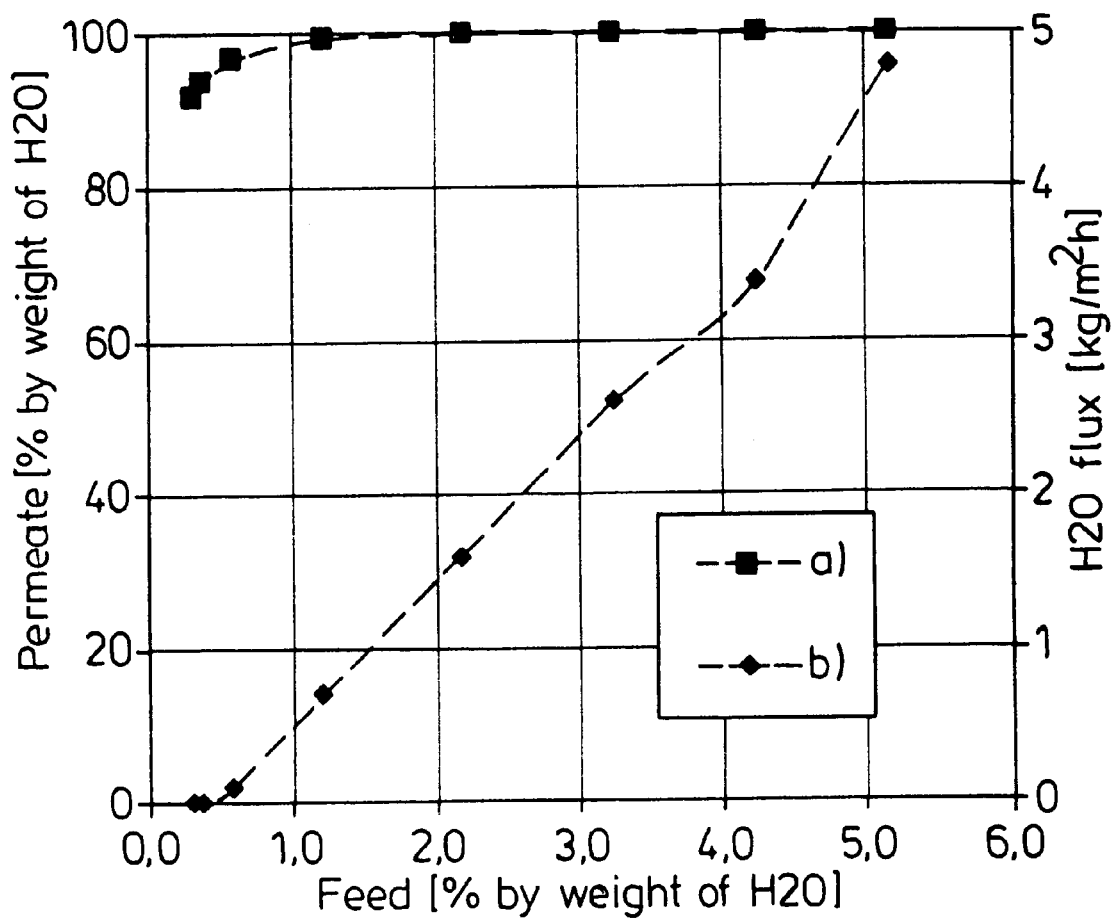
FIG. 5 depicts, in relation to the separation of water from phenol at a feed temperature of 80° C. (permeate pressure 10 and 5 mbars), the water content in the permeate and the water flow rate $Q_{H2O}$ as a function of the water concentration in the feed.

A membrane as described in Example 2 was used for separating water from phenol at 80° C. FIG. 5 shows the efficiency of the membrane; at a feed concentration below 1.0% $H_2O$ the permeate pressure was 5 mbars, and at a feed concentration above 1.0% $H_2O$ it was 10 mbars. Curve a) shows the water concentration in the permeate as a function of the water concentration of the feed. Curve b) shows the water flow rate $Q_{H2O}$ as a function of the water concentration in the feed. It can be clearly seen that high selectivity and permeate flux values can be obtained.

What is claimed is:

1. A porous composite membrane for the separation of fluids, comprising at least a porous support and a zeolite layer applied to the support, wherein the zeolite is a zeolite of the T type or of an erionite type.

2. A composite membrane according to claim 1, wherein the porous support has an average pore diameter of 0.05 μm to 10 μm.

3. A composite membrane according to claim 1, wherein the porous support has a porosity of 10% to 60%.

4. A composite membrane according to claim 1, wherein the porous support is a ceramic material or metal oxide selected from the group consisting of aluminium oxide, silicon dioxide, zirconium oxide, silicon nitride and silicon carbide, or a metal selected from the group consisting of aluminium, silver and special steel, or an organic polymer selected from the group consisting of polypropylene, polyethylene, polytetrafluoroethylene, polysulphone and polyimide.

5. A composite membrane according to claim 1, wherein the porous support is aluminium oxide with an average pore diameter of 0.1 μm to 2 μm and a porosity of 30% to 50%.

6. A composite membrane according to claim 1, wherein the erionite film is applied to the porous support by a hydrothermal process, wherein at least amorphous silicon oxide, sodium aluminate, sodium hydroxide and potassium hydroxide are used as the starting substances.

7. A composite membrane according to claim 1, wherein the zeolite film forms a defect- and crack-free layer on the support material.

8. A composite membrane according to claim 1, wherein the zeolite film is formed by hydrothermal deposition using starting compounds in the following molar ratios:

| | |
|---|---|
| $SiO_2/Al_2O_3$ | 30–150, |
| $OH^-/SiO_2$ | 0.1–1, |
| $Na^+/(Na^+ + K^+)$ | 0.1–1, and |
| $H_2O/(Na^+ + K^+)$ | 10–50. |

9. A composite membrane according to claim 1, wherein the zeolite film has a layer thickness of from 3 to 100 μm.

10. A method for the separation of fluids in mixtures of organic compounds with water or in mixtures or organic compounds optionally containing water, by means of pervaporation, vapor permeation or gas permeation, the method comprising containing the mixtures with the composite membrane of claim 1.

11. Method according to claim 10 for the separation of water from mixtures comprising water and phenol by means of pervaporation, vapor permeation or gas permeation.

12. Method according to claim 10 for separating water from acidic organic/aqueous mixtures by means of pervaporation, vapor permeation or gas permeation.

13. A process for producing the porous composite membrane of claim 1, which comprises the steps of:

applying seed crystals comprising T-type zeolite to a porous support or mixing the support material prior to the production of the porous support with seed crystals comprising T-type zeolite, and completing the production of the support, suspending silicon dioxide in the form of a powder or in colloidal form, sodium silicate, an aluminium salt or an aluminate and compounds containing sodium or potassium ions, in water, ageing the suspension for from at least one hour to up to several days, subsequently immersing the support to which seed crystals have been applied in the suspension and producing the membrane by hydrothermal synthesis at a temperature of 60 to 150° C. for a period of 1 to 168 hours, and drying the finished membrane.

14. A process according to claim 13, wherein the ingredients of the suspension have the following molar ratio in relation to one another:

| | |
|---|---|
| $SiO_2/Al_2O_3$ | 112, |
| $OH^-/SiO_2$ | 0.77, |
| $Na^+/(Na^+ + K^+)$ | 0.77, and |
| $H_2O/(Na^+ + K^+)$ | 20.75. |

* * * * *